W. Dawes,
Organ Action.
N° 52,940. Patented Feb. 27, 1866.
2 Sheets, Sheet 1.
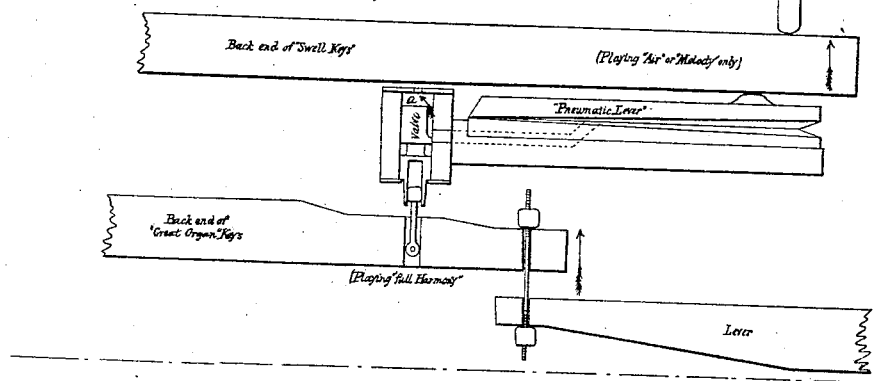
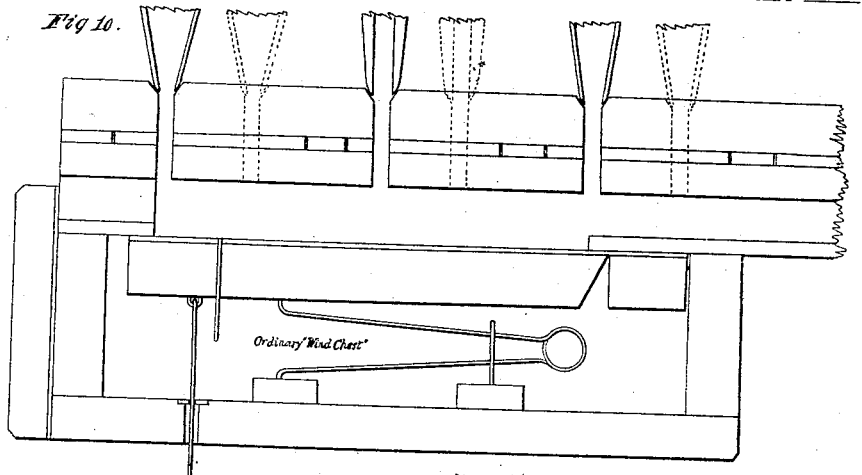
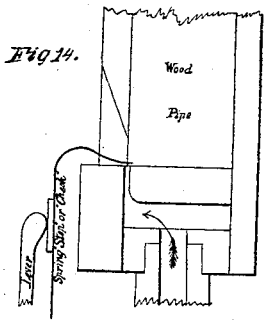
Witnesses.
Inventor.
William Dawes

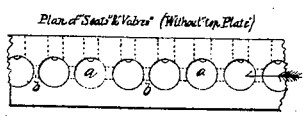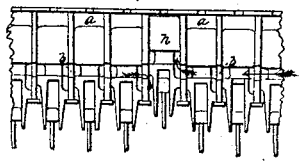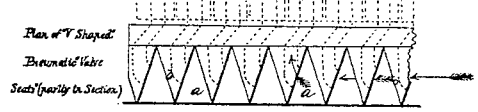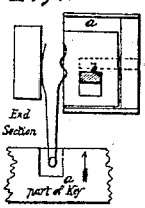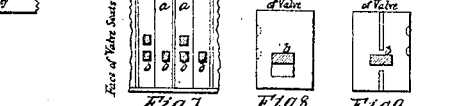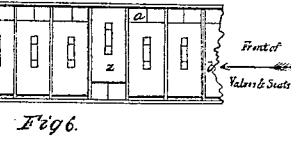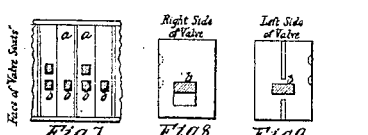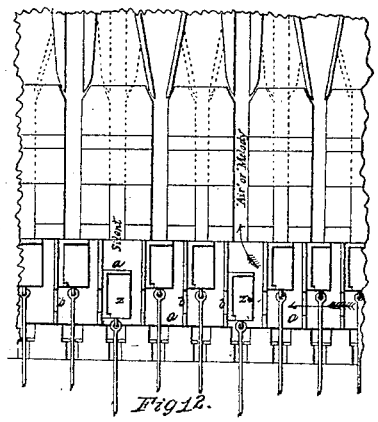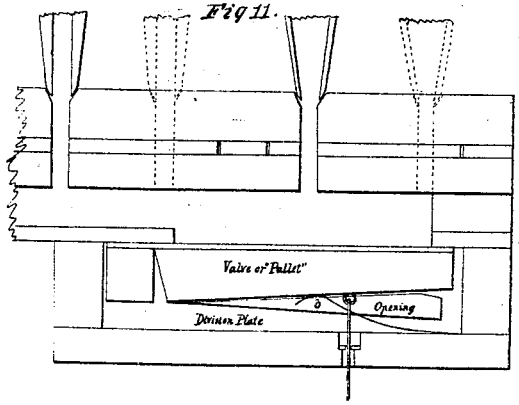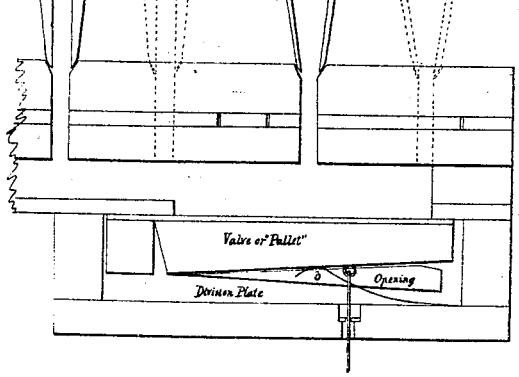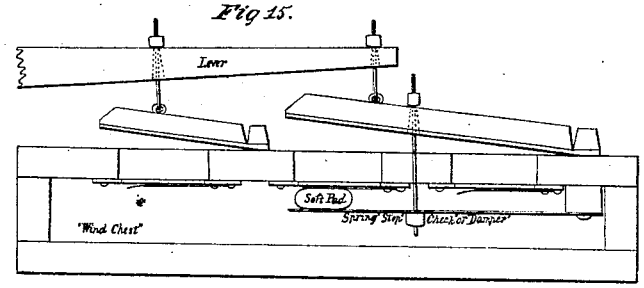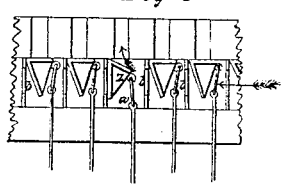

UNITED STATES PATENT OFFICE.

WILLIAM DAWES, OF LEEDS, ENGLAND.

IMPROVEMENT IN ORGANS, HARMONIUMS, &c.

Specification forming part of Letters Patent No. 52,940, dated February 27, 1866.

*To all whom it may concern:*

Be it known that I, WILLIAM DAWES, of No. 2 Ridge Terrace and No. 56 Wade Lane, both in Leeds, in the county of York, England, engineer and commission agent, a subject of the Queen of Great Britain, have invented or discovered new and useful Improvements in Organs, Harmoniums, and other Musical Instruments; and I, the said WILLIAM DAWES, do hereby declare the nature of the said invention, and in what manner the same is to be performeed, to be particularly described and ascertained in and by the following statement thereof—that is to say:

My invention consists of a novel and peculiar arrangement and construction of certain parts of organs, harmoniums, and such like keyed instruments, whereby the player is enabled to give a more perfect accent or expression to the air or soprano, especially in full or harmonized music. This I effect by causing one or more ranges or ranks of pipes, tongues, or vibrators, (stops,) as the case may require, to sound or give automatously the upper or soprano note only; however, many notes may, at the same time, be used (played) by the player, as heretofore, in producing a full volume of harmony upon the instrument. I in some cases obtain this before-named effect by coupling, in a peculiar manner, one part or portion of the instrument to another part—say, for instance, the swell-organ to the great organ, or vice versa—but instead of doing this in the usual manner, or with the ordinary pneumatic lever-coupler at present in use for coupling one section or portion of an organ to another, I employ a peculiar arrangement of coupler, (see Figures 1, 2, and 3,) so constructed that by its action the air or soprano note only shall or can be transmitted, given out, or made to speak; or, in other words, all notes below the air or soprano note of the piece or music being performed shall, in the wind-chest or organ to which this coupler conveys or transmits the action from the keys, close or become dumb or silent, while the top or upper note of the chords or harmony, which constitutes the air or soprano of the piece or music, is sustained, as before stated, similar to a single note or solo instrument; and it may be necessary to explain that in thus carrying out or applying my invention—that is, with the coupler—I prefer making the said coupler on what is technically known as the "pneumatic-lever principle," but considerably modified, so as to embody the novelty of this my said invention, and to this end or purpose I use an entirely new or different arrangement of the small inlet or leading valves or pallets, (see Figs. 1 to 9,) so formed and constructed that the condensed or compressed air employed to actuate the levers is caused to pass through or from one valve to the next, in succession, downward or in the direction from right to left, or from treble to bass of the keys of the instrument, so that this coupler wind-chest containing these valves or pallets, or the seats in which they work, instead of being made in one long chamber or chest, as heretofore, is, as it were, divided into a series of separate small chambers, *a a*, one for each valve, pallet, or note, these chambers communicating with each other by openings or perforations *b b*, so placed that the sliding or opening of any one or more of the valves or pallets, by pressing down its corresponding key, shall close the said openings or perforations in the division next below itself, as at *z z*, and thus the communication from one chamber to the other through the whole or entire series is complete or continuous only so long as the keys are unpressed, so that in playing upon the instrument the continuity of this wind-chest or series of chambers and the compressed air therein ceases at or immediately below the upper top or soprano note of the music, as indicated by the arrows in Figs. 2, 5, 12, and 13, all notes below this being neutralized or silenced in consequence of this, the soprano note, having, by the closing of the apertures *b b*, cut off the communication and supply of compressed air from them, although itself retaining these, and with them its powers of action and voice. In some cases I prefer using for these valves or pallets a specially-constructed V-shaped slide-valve possessing the before-named peculiarities. (See Figs. 4 to 9.) This new single note or soprano coupler, when placed so as to give the air or soprano upon the swell-organ, or upon any portion made to swell, enables the player, by the use of the swell-pedal, while playing full harmony to bring out or accent *ad libitum* the air or soprano only of any portion or passage of the music he is performing, as though a flute, cor nopean, or other similar single-note instrument were used for the purpose by an additional or separate player. In some cases I arrange this single note or soprano coupler to give out the octave note above or below the air or soprano note, or both, in addition to the direct unisons, by the employment of levers from the said coupler similar to the sub and super octave levers at present in use with ordinary couplers, and thus produce automatously upon one part or section of an instrument the air or soprano in pure octaves, without chords or harmony, with a power and effect approaching the human voice, while the other parts or sections of the same instrument are giving the full chords or harmony, as heretofore.

I also, in some cases, produce the before-named effect by arranging pallets and grooves or channels in or to one or more of the ordinary wind-chests, (see Figs. 10, 11, and 12,) so that their pipes, tongues, or vibrators shall speak or sound the air only when the ordinary coupler is being used in connection with the sepallets and wind-chest, by causing the top or soprano note to shut off or silence all notes below itself, similar to the before-named coupler. (See Z Z, Fig. 12.) Each top or soprano note, while it silences all notes below or to the left of itself, so long as it constitutes the air or soprano of the music, has also the power to restore or allow the speaking of any note below itself when it may become the top, air, or soprano note of the piece or music.

To render this last-named method of carrying out my invention clear and understood by all readers of my specification, it must be explained that these before-named pallets and grooves or channels may be appended to the ordinary wind-chest to feed or open into the back ends of the wind-grooves underneath the pipes, (see Figs. 10, 11, and 12,) and, being similarly constructed to the before-named small or coupler wind-chest as regards the silencing of all but the top or upper note, it will, when used instead of the ordinary wind-chest and pallets, give out the air or soprano note only on that portion of the instrument instead of the full chords or harmony, as heretofore, the two sets of valves or pallets, old and new, being so arranged that one set only of them can be coupled to the keys or used at one and the same time.

In applying my invention to some organs, harmoniums, or piano-fortes, I sometimes obtain the before-named effect by adding, as a separate portion for this purpose, one or more ranges or ranks of pipes, tongues, or vibrators to the upper or treble portion of the manuals or keys of the instrument, these being so arranged as to be similarly actuated—that is, to give the air or soprano note only—either by means of the before-named coupler, the arrangement of pallets and grooves or channels in the wind-chest similar to Figs. 11, 12, and 13, a stop-check or damper action in or against the mouths or other parts of the pipes, tongues, or vibrators, (see Figs. 14 and 15,) or any other mechanical or automatous means or method whereby the object and effect of my invention can be realized.

Having thus described and shown the nature of my said invention, and the manner in which the same is or may be used or carried into effect, I would observe that I do not confine or restrict myself to the precise details or arrangements which I have described or referred to, as many modifications and variations may be made therefrom without deviating from the principles or main features of the said invention; but

What I consider to be novel and original, and therefore claim as the invention secured to me by the hereinbefore in part recited Letters Patent, is—

The giving an improved or increased accent or expression to organs, harmoniums, and other harmonious keyed instruments by imparting to them the mechanical capability of giving or sounding automatously, the air (soprano) or melody only additionally, upon one or more parts, portions, or sections, while the other parts of the same instrument are giving or sounding the full chords or harmony, as heretofore, both parts or sections receiving at the same time the same first motion, action, or influence from the keys and player.

WILLIAM DAWES.

Witnesses:
THOS. B. TURNER,
THOS. GRISDALL, Jr.